Sept. 21, 1965   C. W. FLEIGHER ETAL   3,206,913
BAG FILLING MACHINE

Filed Aug. 14, 1962   13 Sheets-Sheet 1

Fig.1.

Inventors:
Charles W. Fleigher,
William J. Delaney,
by Arthur D. Thomson
Attorney

Sept. 21, 1965  C. W. FLEIGHER ETAL  3,206,913
BAG FILLING MACHINE

Filed Aug. 14, 1962  13 Sheets-Sheet 7

Inventors:
Charles W. Fleigher,
William J. Delaney,
by Arthur D. Thomson
Attorney Sept. 21, 1965 C. W. FLEIGHER ETAL 3,206,913
BAG FILLING MACHINE
Filed Aug. 14, 1962 13 Sheets-Sheet 13

Inventors:
Charles W. Fleigher,
William J. Delaney,
by Arthur D. Thomson
Attorney

United States Patent Office 3,206,913
Patented Sept. 21, 1965

3,206,913
BAG FILLING MACHINE
Charles W. Fleigher, Stoneham, and William J. Delaney, South Boston, Mass., assignors of sixty percent to Albert H. Ginsburg, Newton, Mass.
Filed Aug. 14, 1962, Ser. No. 216,813
14 Claims. (Cl. 53—189)

This invention relates in general to packaging machinery, and more particularly to machines for packing articles in plastic bags.

Certain plastic films commonly used for packaging, such as polyvinyl chloride and polyvinyl acetate are smooth, highly flexible, and virtually air-tight, and have a pronounced tendency to stick to themselves. These characteristics create problems in handling bags made of such films. The bags are difficult to open and to separate from one another when stacked flat. Furthermore, the bags will not hold their shape when opened, as paper bags do, for example, and it is difficult to insert soft articles, such as items of clothing, without wrinkling the article. Bag filling machines of automatic or semi-automatic type hitherto used for filling paper bags have proved inefficient for filling flexible plastic bags, as considerable hand manipulation of the bags and the articles is usually required in order to produce satisfactory packages.

The object of this invention is to provide a machine by means of which articles of various kinds may be inserted into bags, particularly bags made of plastic film, rapidly, with a minimum of labor and attention, and without danger of crushing or wrinkling the article, thus effecting a substantial saving in packaging costs.

The machine consists in general of a holder on which a stack of flat bags is secured, an air jet system for inflating the top bag of the stack, a mechanical holder which enters the inflated bag and holds it open during loading, means for guiding an article into the open bag, and a release mechanism which allows the filled bag to drop off, while the remaining bags in the stack are held in place. In one of the forms here disclosed, the machine is adapted for semi-automatic operation. The articles are dropped in by hand, and the operator then presses a control button which sets into operation the mechanisms for dropping off the filled bag and opening the next bag. This machine may be used for packaging a wide variety of single articles, or combinations of similar or dissimilar articles. In another form, suitable for fully automatic operation, the machine includes a conveyor, a counter, and an automatic control system, which actuates the release and opening mechanisms when a specified number of articles have been inserted into the top bag. This form of machine is intended primarily for long runs of one particular type of article, for example for packing a specified number of bakery rolls or oranges in each bag.

Other objects, advantages, and novel features of the device will be apparent from the following detailed description.

In the drawings illustrating the invention:

FIG. 7 is a side elevation, one side of the housing being omitted for clarity, of the loading end of a fully automatic machine constructed according to the invention;

FIG. 13 is a fragmentary plan view of the linkage controlling the bag holding arms in the machine of FIG. 7, other parts being omitted for clarity;

Semi-automatic machine

In the machine of FIGS. 1–5, the working parts are mounted partly within and partly outside a housing, generally indicated by the numeral 20, composed of panels of sheet metal or other suitable material. The housing has a rear wall 21 connected to a pair of side walls 22 and 23 which are cut off diagonally at the front upper portion of the machine, and a horizontal top plate 24 which extends a short distance forward from the rear panel and is connected to the side walls. The side walls are connected together at their lower front ends by a pair of short vertical end plates 25 and 26 joined by an oblique intermediate plate 27. Mounted in the space between side walls 22 and 23 is a channel-shaped chassis 28 having side walls 28a and 28b. The chassis carries inwardly extending flanges 29 and 30 to which is attached a cover plate 31 having a recessed lower portion 31a. The entire chassis and cover plate assembly is suspended on a pair of pivots 32 and 33, mounted on side walls 22 and 23 and extending into blocks 34 and 35 attached to walls 28a and 28b, respectively, so that the chassis can be tilted to various angles with respect to the housing. A pair of knobs 36 and 37 are threaded into nuts 36a and 37a, respectively, attached to walls 28a and 28b and are movable through arcuate slots in walls 22 and 23 to adjust the slope of the chassis. The chassis may be locked in place by tightening the knobs.

A bag holder plate 40 is removably disposed in the recessed portion 31a of cover plate 31. A pair of pins 41 extend up through the cover plate and extend through holes 42 in the holder plate 40 when the latter is in place on the machine.

Pins 41 are mounted on a yoke 43 which is, in turn, mounted on a shaft 44 journalled in blocks 45, 46 on side walls 28a, 28b of the chassis. Shaft 44 extends out through wall 23 of the housing and terminates in a handle 44a. A spring 47 (FIG. 3) normally urges the yoke and pins into operating position. By pulling the handle 44a forward, when plate 55 is raised, as will be later explained, the pins may be swung forward to facilitate loading plate 40, along with a stack of bags, onto the machine.

Figure 6:
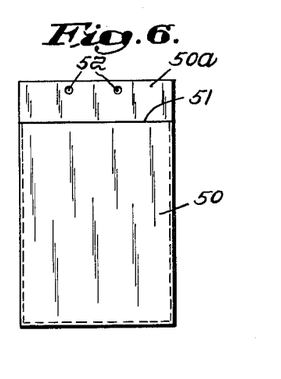
FIG. 6 is a plan view of an unopened bag of the type for which the machine is used.
Figure 8:
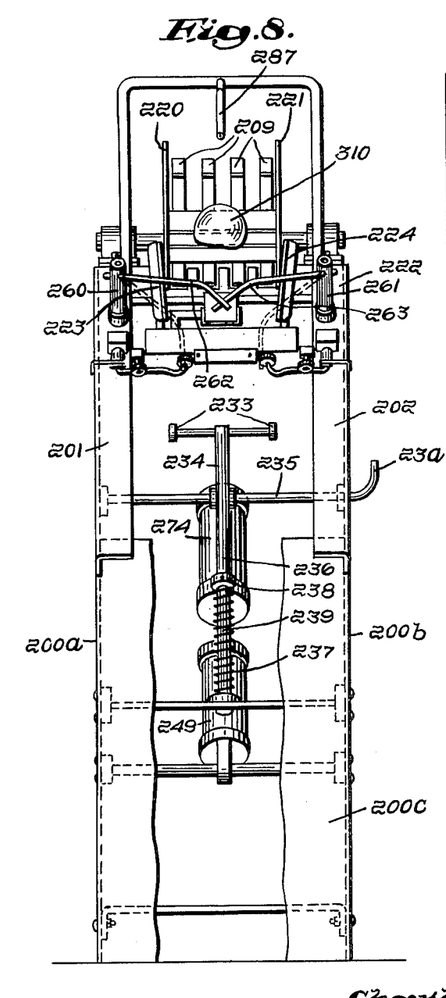
FIG. 8 is an elevation of the front, or loading end, of the machine of FIG. 7.
Figure 9:
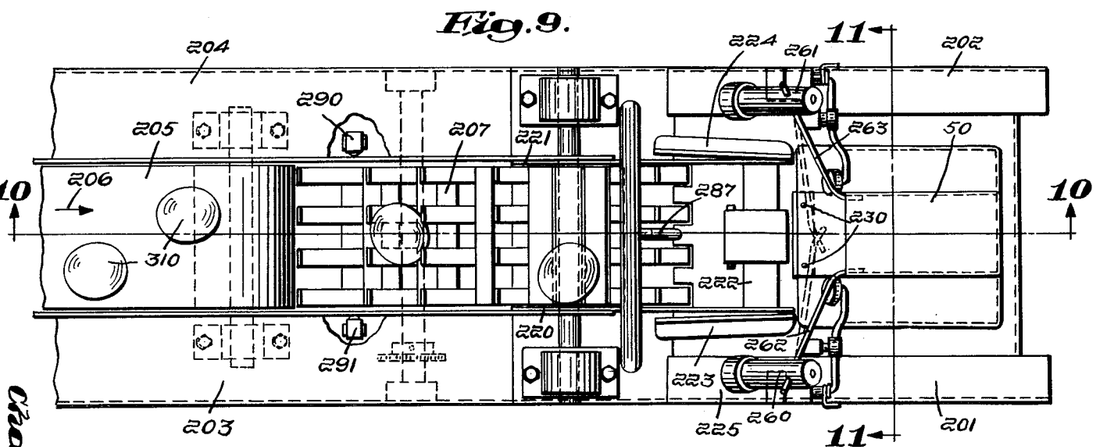
FIG. 9 is a plan view of the loading end of the machine of FIG. 7.
Figure 10:
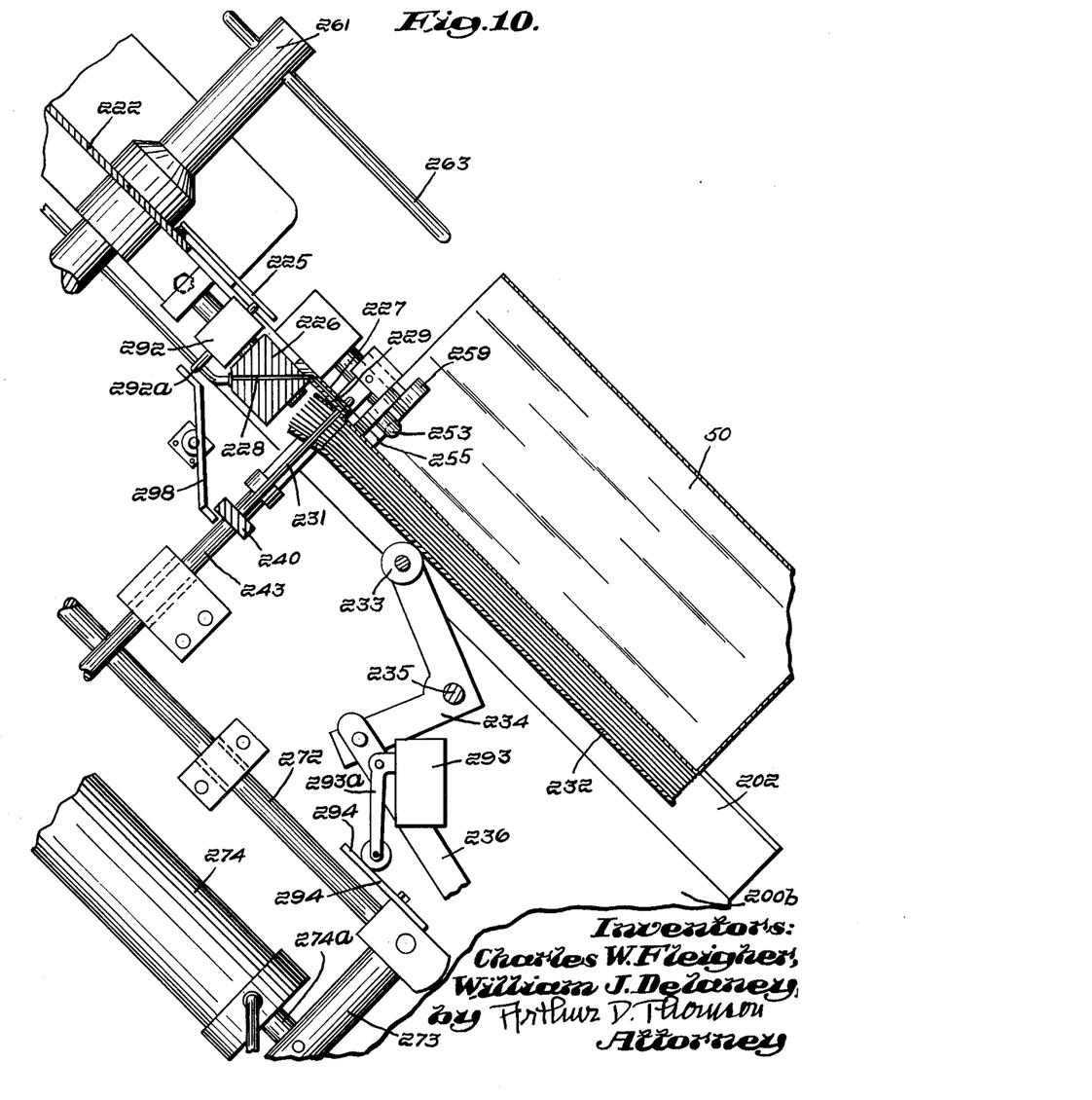
FIG. 10 is an enlarged fragmentary cross-section taken along line 10—10 of FIG. 9.

A plastic bag 50 of the type used on the machine is illustrated in FIG. 6. The bag has a mouth 51 and a flap 50a on one of its walls extending beyond the mouth in the manner of a common envelope. It is understood that the bag may be of flat, gusseted, or any other common construction. The flap is provided with holes 52 for receiving pins 41. A stack of such bags is placed on holder plate 40 with the holes in their flaps aligned with holes 42.

When the holder plate 40, with a stack of bags 50 is in place on the machine, a top plate 55 rests on the flaps 50a and has holes 56 in which the upper ends of pins 41 are received. The under side of plate 40 is engaged by a pair of rollers 57 carried by a pair of arms 58. The arms are fixed to a shaft 59 journalled on the side walls of chassis 28. The shaft is attached to a lever 60 which extends up through a slot 61 in flange 30. The lower end of lever 60 is connected to a tension spring 62 anchored on chassis 37. The spring tension normally urges rollers 57 up against plate 40 to support the plate, their movement being limited by engagement of lever 60 with the upper end of slot 61.

Plate 55 is mounted on a block 63. The plate has a passage 64 leading to a shallow elongated opening 64a in the forward edge. Block 63 has a passage 65 communicating with passage 64. These passages constitute one of the air nozzles through which compressed air is discharged to open the top bag at the beginning of each loading cycle, as will be later described. A second air nozzle 66, which may be made of rigid tubing, extends upward through the top plate 24 and terminates in a portion 66a directed obliquely downward. The two nozzles perform the initial opening and inflation of the top bag.

Figure 2:
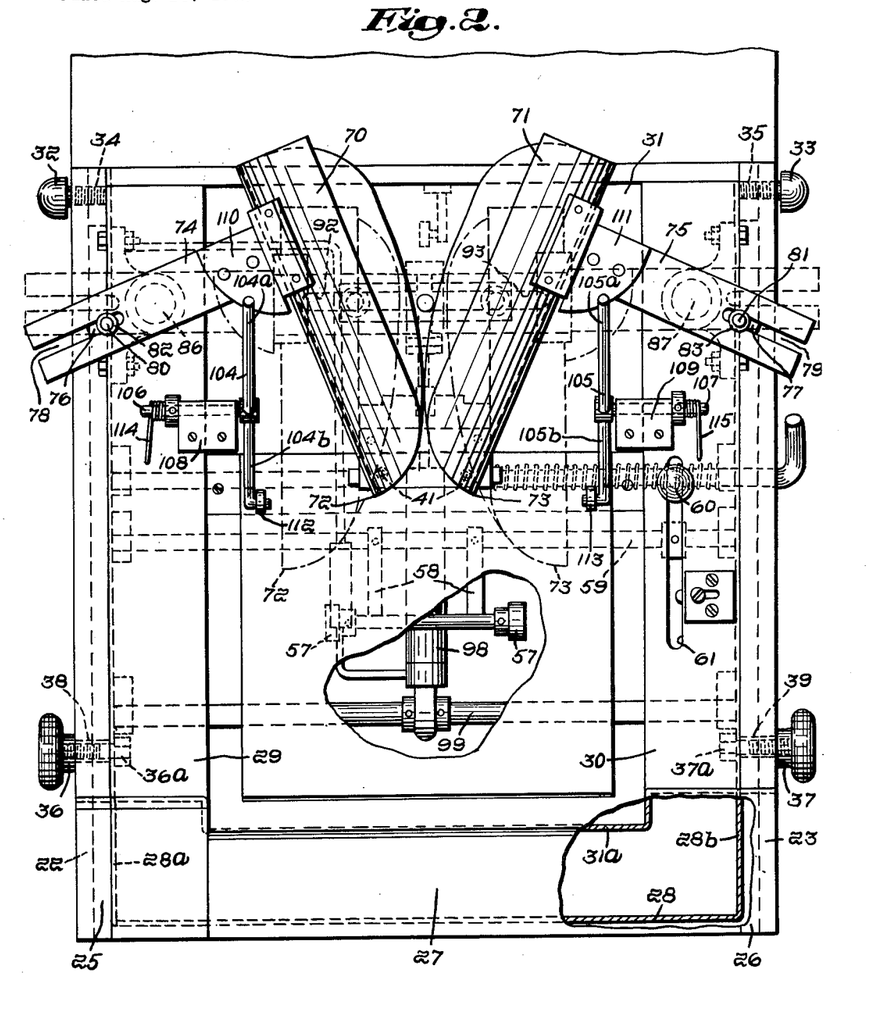
FIG. 2 is an enlarged view, taken in the direction of line 2—2 of FIG. 1 of the front, or loading, end of the machine.
Figure 2A:
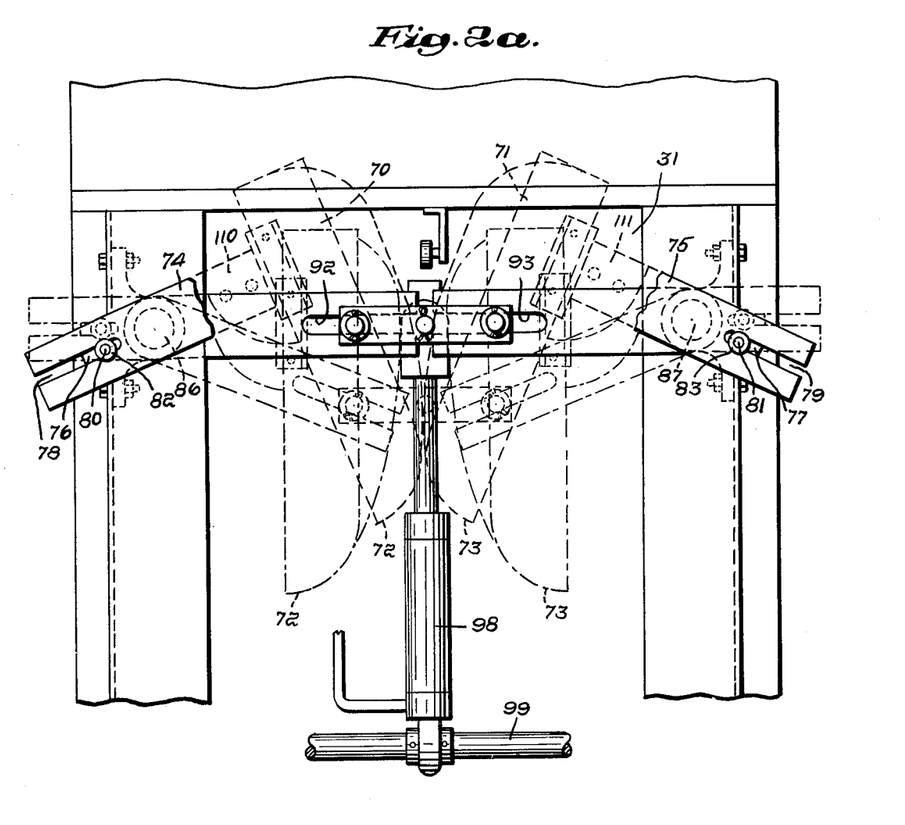
FIG. 2a is an enlarged view of the front, or loading, end of the machine, parts being omitted for clarity.

The mechanical holder for the opened bag includes a pair of horns 70 and 71, mounted on the forward end of the machine, above the bag holder plate, which are movable to the position shown by dotted outlines 72 and 73 in FIG. 2. In that position they extend into the mouth 51 of the inflated bag and engage the walls of the bag on the inside to hold it securely during filling. Horns 70 and 71 are mounted on bars 74 and 75, which are grooved on their under sides to slide along arms 76 and 77, respectively. Bars 74 and 75 have slots 78 and 79 in their outer ends, and bolts 80 and 81, mounted in arms 76 and 77, respectively, extend up through the slots and are engaged by nuts 82 and 83 on top of the bars. By loosening the nuts, the spacing of the horns in the transverse direction of the machine can be adjusted to accommodate bags of various widths.

Arms 76 and 77 are attached to collars 84 and 85 secured to shafts 86 and 87, respectively. These shafts are rotatably mounted in pairs of pillow blocks 88 and 89 mounted on the side walls 28a and 28b, respectively, of the chassis. Connected to the lower ends of shafts 86 and 87 are a pair of links 90 and 91 having slots 92 and 93. A yoke 94 carries pins 95 and 96 which are slidably received in slots 92 and 93, respectively. Connected to yoke 94 by a clevis 97 is the piston rod 98a of an air cylinder 98. The lower end of the cylinder is rotatably mounted on a shaft 99, supported on side walls 28a and 28b of the chassis. The piston rod is alternately advanced in the direction of arrow 100 in FIG. 4 and retracted in the direction of arrow 101 by alternately admitting compressed air to opposite ends of the cylinder through air hoses 102 and 103. Advancement of the piston rod moves horns 70 and 71 to the position shown in full lines in FIG. 2, and retraction of the rod moves the horns to the position shown by dotted lines 72, 73.

Mounted on either side of horns 70, 71 is a pair of rocker arms 104 and 105, which perform the function of holding down the remaining bags in the stack while the top bag is filled and dropped off. These arms are mounted on shafts 106 and 107 rotatable in blocks 108 and 109 secured to flanges 29 and 30, respectively. Arms 104 and 105 have upper portions 104a and 105a which engage cams 110 and 111 mounted on bars 74 and 75, respectively and lower portions 104b and 105b carrying knobs 112 and 113 which engage the side margins of the stack of bags 50. Arms 104 and 105 are urged by springs 114 and 115 anchored on flanges 29 and 30 in a direction to raise the knobs 112 and 113 out of contact with the bags (counter-clockwise as viewed in FIG. 4). Cams 110 and 111 are so shaped as to turn arms 104 and 105 into a position to press rollers 112 and 113 down on to the stack of bags as piston rod 98a retracts, drawing horns 70 and 71 into engagement with the opened top bag. At the end of the advance stroke of rod 98a, when the horns are withdrawn from the top bag, arms 104 and 105 are relieved by the cams 110 and 111, and are turned by springs 114 and 115 into a position to raise knobs 112 and 113 out of engagement with the bags.

During the period when the bags are not held down by arms 104 and 105, their flaps are held down by plate 55 which engages the upper ends of pins 41. This plate is mounted on block 63 which is tiltable on trunnions 116 and 117 mounted in blocks 118 and 119 on the under side of cover plate 31. A striker plate 120 is attached to block 63 and extends down into the path of a bolt 121, adjustably mounted in a bracket 122 attached to clevis 97 and locked by means of a nut 123. A tension spring 124, connected to the lower end of plate 120 and anchored on a bracket 124a, attached to the chassis, normally urges block 63 in a direction (clockwise, as viewed in FIG. 4) to hold plate 55 down on the flaps of the stack of bags. During the retract stroke of piston rod 98a, bolt 121 engages plate 120 and tilts block 63 counter-clockwise, raising plate 55 and freeing the flaps of the bags. At the beginning of the retract stroke bolt 121 is spaced from plate 120. By adjusting bolt 121, the initial spacing may be set so that plate 55 is raised just as, or shortly after, arms 104 and 105 engage the bags.

Figure 5:
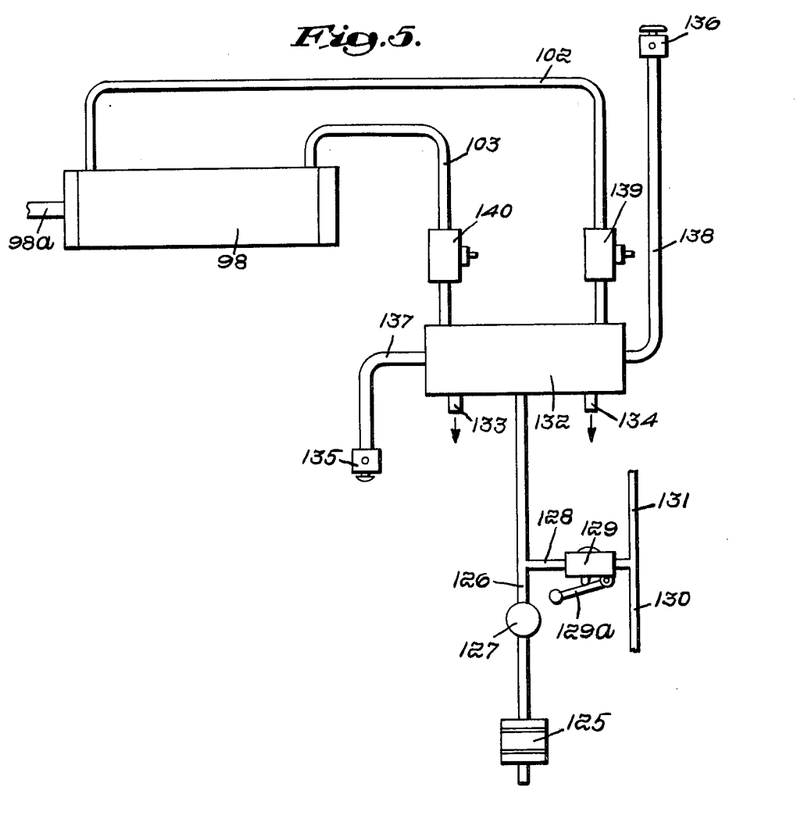
FIG. 5 is a schematic view of the pneumatic control system for the machine.

The pneumatic system is shown schematically in FIG. 5. The system is connected through a manual shut-off valve 125, mounted at any convenient location on the machine, to an external source of compressed air (not shown). This leads to a main supply line 126 in which a pressure regulating valve 127 is preferably provided. A branch line 128 leads from line 126 through a valve 129 to one line 130 which is connected to passage 65 in block 63 and a second line 131 which is connected to nozzle 66. Line 126 leads to a four-way valve 132 which is connected through lines 102 and 103 to opposite ends of cylinder 98. Valve 132 is of a common type having a control element which, in one position, connects line 126 to line 102 and line 103 to an exhaust line 133, and in another position, connects line 126 to line 103 and line 102 to an exhaust line 134. The control element is actuated by a pair of bleeder valves 135 and 136 of push button operated type, connected to valve 132 by lines 137 and 138, respectively. The connections are so arranged that line 102 is connected to the pressure line when valve 135 is actuated, causing piston rod 98a to be retracted, and line 103 is connected to the pressure line when valve 136 is actuated, causing the piston rod to be advanced. A pair of flow control valves 139 and 140 are preferably provided in lines 102 and 103, respectively. The air line connections are preferably made of flexible hose.

Figure 1:
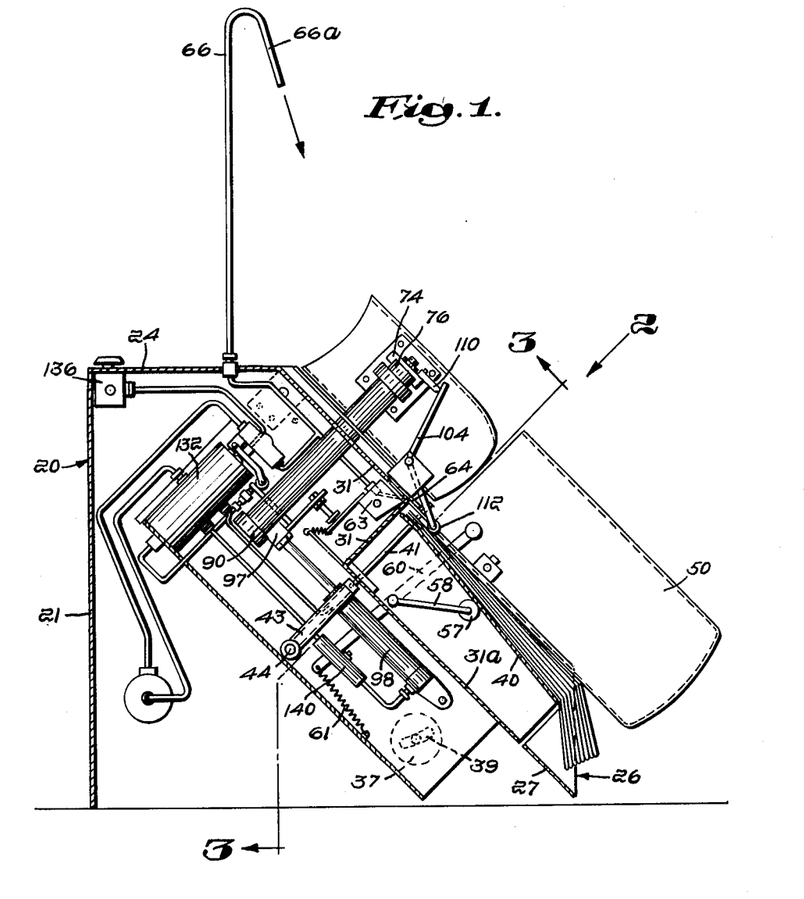
FIG. 1 is a side elevation of a semi-automatic bag filling machine constructed according to the invention, parts of the housing being shown in cross-section for clarity.
Figure 3:
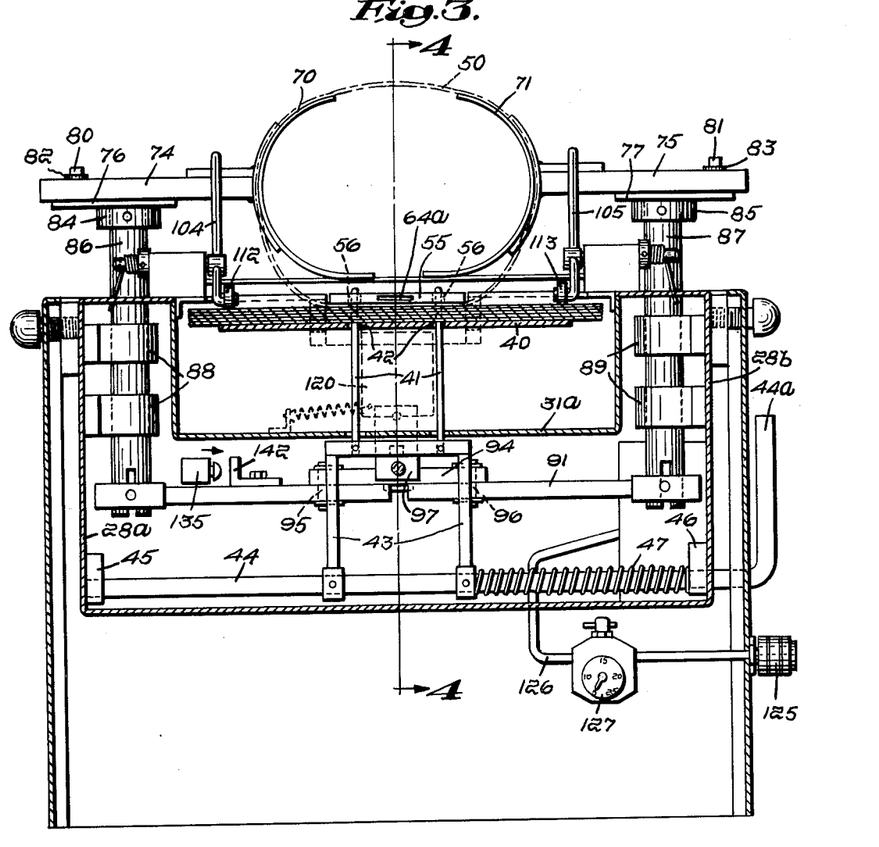
FIG. 3 is an enlarged cross-section taken along line 3—3 of FIG. 1.
Figure 4:
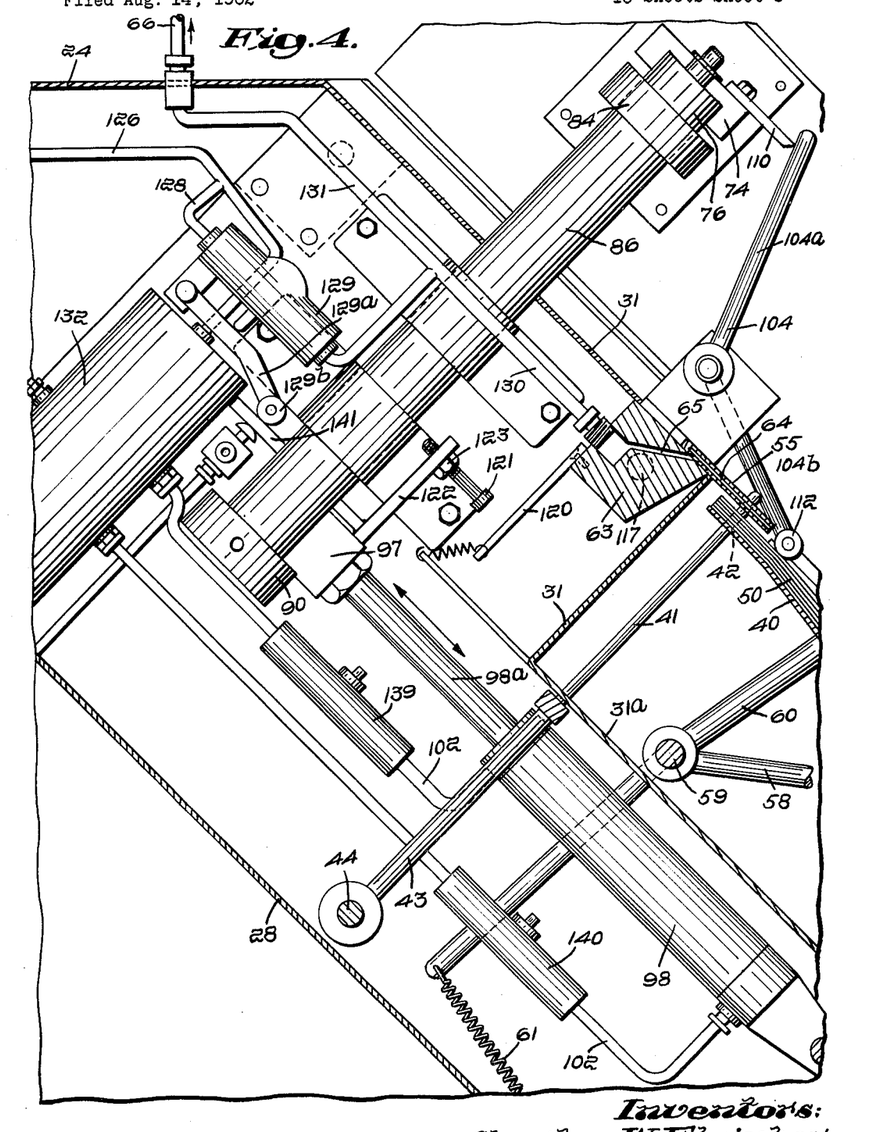
FIG. 4 is an enlarged fragmentary cross-section taken along line 4—4 of FIG. 3.

The physical arrangement of the parts of the pneumatic system which interact with mechanical parts of the machine is best seen in FIGS. 3 and 4. Valve 129 is of the lever-operated type which is opened by means of a lever 129a carrying a roller 129b. This valve is placed so that the roller is engaged, near the upper end of the piston stroke (as viewed in FIG. 4) by a striker plate 141 mounted on clevis 97. Push button valve 135 is mounted so as to be actuated by a striker plate 142, mounted on link 90, when the piston rod reaches the end of its advance stroke. Valve 136 is intended to be manually operated by the operator of the machine and may be mounted in any convenient location on the housing, for example, on the top plate 24, as shown in FIG. 1.

The operation of the semi-automatic machine is as follows:

With the control valve 125 turned on, the piston rod 98a will be in retracted position, or will immediately assume that position because of the action of valve 135. This is a dwell position in the cycle of the machine, and motion will not take place until the operator presses the button of valve 136. When the piston rod is in this position, plate 55 is tilted up. A holder plate 40 carrying a stack of bags 50 is placed in the machine, with pins 41 extending through the holes 42 in the plate and the holes 52 in the bag flaps. This loading operation is facilitated by pulling handle 60 forward to carry rollers 57 down, and pulling handle 44a forward to bring pins 41 into a more accessible position. When the handles are released the holder plate and bags are brought into operating position on the machine.

To start the bag opening cycle the operator presses the button of valve 136. This actuates the four-way valve 132 to cause the piston rod 98a to be advanced. On the advance stroke of the piston rod, horns 70 and 71 are turned back into their full line position in FIG. 2. Bolt 121 is disengaged from plate 120 allowing plate 55 to drop down and hold the flaps of the bags on pins 41. Arms 104 and 105 are relieved by cams 110 and 111 so that knobs 112 and 113 are raised off the side margins of the bags. When striker plate 141 engages roller 129b on lever 129a, valve 129 is opened, admitting compressed air to nozzles 64 and 66. The blast of air from the thin flat orifice 64a is directed almost parallel to the bag and serves to raise the edge of the top wall of the bag. As soon as the mouth of the bag has been thus blown open, the air jet from nozzle 66 inflates the bag to fully open position.

At the end of the advance stroke, valve 135 is engaged by striker plate 142, actuating the four-way valve 132 so as to cause the piston rod to retract. During the retract stroke horns 70 and 71 move into their bag holding position, shown in dotted outline in FIG. 2. Shortly after they enter the mouth of the inflated bag, striker plate 141 disengages from lever roller 129b, allowing valve 129 to close and shut off the air jets. Toward the end of the retract stroke, rollers 112 and 113 are brought to bear on the side margins of the stack of bags and plate 55 is lifted by engagement of bolt 121 with plate 120.

At the end of the retract stroke, the top bag is held securely by the horns 70 and 71. As can be seen in FIG. 3, the opened bag is held in elliptical shape and is thus narrower than the flat bags remaining in the stack. The knobs 112 and 113 engage the stack to either side of the opened top bag.

The machine remains in its dwell position while the operator drops the article, or articles, to be packed into the bag. The article is conveniently dropped between the horns and slides down into the bag. When the bag has been filled, the operator presses the button of valve 136, starting the machine on a new cycle. As horns 70 and 71 move back, releasing the filled bag, it drops off, leaving the next bag in the stack ready to be opened by the air jets and engaged by the horns, as just described.

The semi-automatic machine just described can be used for packaging a wide variety of articles, and groups of articles either alike or different. The horns may be adjusted to fit bags of different widths by loosening nuts 80 and 81 and moving the arms 74 and 75. The tilt of the chassis 28 can be adjusted to the best angle for satisfactory operation, with the particular articles being packaged. For example, a steep angle may be used for rigid articles, and a shallower angle may be required when packing crushable articles, such as folded garments, to prevent them from wrinkling or slumping into the bottom of the bag.

*Automatic machine*

The automatic machine shown in FIGS. 7 through 14 includes a housing, generally indicated by the numeral 200, having side panels 200a and 200b, and a front panel 200c extending part way up the forward, or bag loading, end of the machine. Above panel 200c the side walls are cut out on a slope and angle brackets 201, 202 are mounted along the sloping top edge of each side wall. Mounted along the horizontal upper edges of the side panels are angular guard rails 203 and 204.

Mounted between guard rails 203 and 204 is a horizontal conveyor belt 205 which is driven in the direction of arrow 206. The rear end of the machine housing is not shown, but it is understood that panels 200a, 200b, and rails 203, 204 may be extended to any length required to house a conveyor belt of the desired length.

Figure 15:
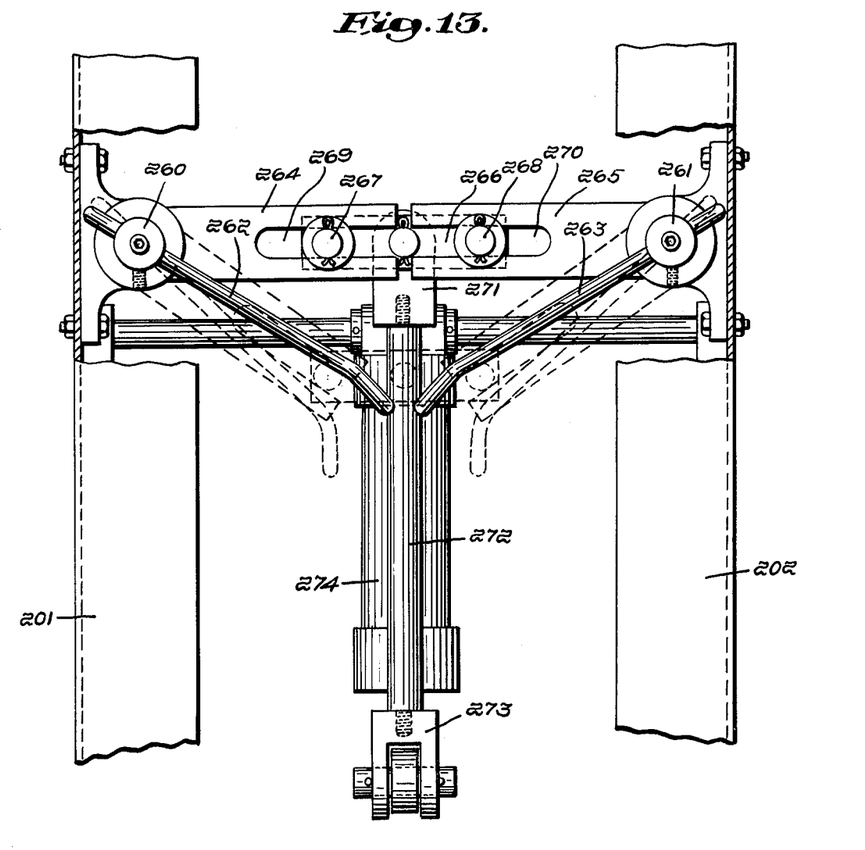
FIG. 15 is a schematic drawing of the conveyor drive system for the machine of FIG. 7.

Near the delivery end of belt 205 is a lift conveyor consisting essentially of a link belt 207, carried by a chain and sprocket drive 208, and having sets of outwardly extending fingers 209 forming compartments 210. The fingers carry masking plates 209a. The conveyors are driven, as shown schematically in FIG. 15, by an electric motor 211 geared to a drive shaft 212. The drive shaft is connected through an electric clutch 213, to a shaft 214 which drives a chain and sprocket drive 215. An electric brake is provided to stop the motion of shaft 214. Drive shaft 212 is also connected, through an electric clutch 217, to a shaft 218 which drives a chain and sprocket drive 219 connected to the chain and sprocket drive 208 of the lift conveyor. An electric brake 220 is also provided to stop the motion of shaft 218. The motor is driven continuously when the machine is in operation, and the clutches and brakes, which start and stop the motion of the two conveyors, are energized at certain times in the operating cycle of the machine by the electric control system which will be later described.

On either side of the upper end of the lift conveyor belt 207 are guard plates 220 and 221. Mounted at an oblique angle below and in front of this conveyor are a fixed guide plate 222 and guide rails 223, 224. A switch actuator plate 225 is hinged on the lower end of plate 222. Below the lower end of plate 225 is a fixed bar 226 to which is attached a plate 227. Bar 226 and plate 227 have communicating passages 228 and 229 which constitute one of the air nozzles for opening the bags.

Plate 227 has holes 230 in which the upper ends of a pair of pins 231 are received. A removable bag holder plate 232, similar in all respects to plate 40 used on the semi-automatic machine, is engaged with pins 231 and carries a stack of the bags 50. Plate 232 is engaged, on its under side, by a roller assembly 233 carried by a rocker arm 234 which is fixed to a shaft 235 and connected to a tubular link 236. This link is slidable on a rod 237, anchored to the housing of the machine, and carries a collar 238 which is engaged by a compression spring 239 to urge the roller assembly 233 into engagement with the plate 232. Shaft 235 has a handle portion 235a extending out through the housing so that the rocker arm may be turned to relieve pressure on plate 232 when inserting the plate.

Figure 11:
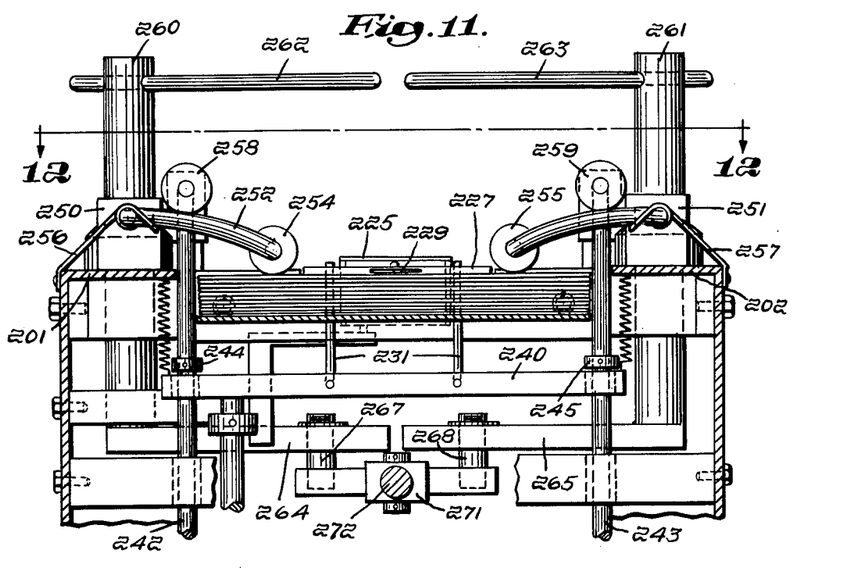
FIG. 11 is an enlarged fragmentary cross-section taken along line 11—11 of FIG. 9.
Figure 12:
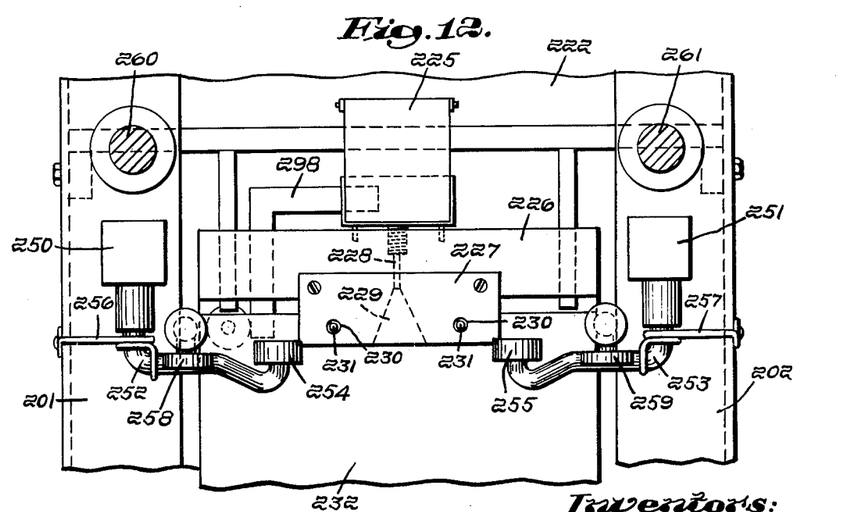
FIG. 12 is a fragmentary cross-section taken along line 12—12 of FIG. 11.

As best seen in FIG. 11, pins 231 are mounted on a cross bar 240 which is slidable up and down on guide rods 241 and is urged upward by coil springs 241a bearing on adjustable collars 141b. A pair of pull rods 242 and 243 pass freely through the bar, and carry collars 244 and 245 which engage the top of the bar when the rods are moved downward. Rods 242 and 243 are connected at their lower ends to a tie bar 246 (FIG. 7) which is connected to a rocker arm 247 rotatably mounted on a shaft 248 supported on the housing. An air cylinder 249, which controls the movement of the pull rods, has its piston rod 249a connected to arm 247. When the piston rod is advanced, rods 242 and 243 are pulled down, causing collars 244 and 245 to engage the bar 240 and retract the pins out of engagement with the bag flaps. When the piston rod is retraced, bar 240, with the pins, is returned to its original position by springs 241a.

Mounted on rails 201 and 202 are blocks 250 and 251 in which angular arms 252 and 253 are journalled. On their inner ends the arms carry rollers 254 and 255 which, at certain times in the operation of the machine, are brought down to engage the side margins of the stack of bags. The arms are normally urged upward by leaf springs 256 and 257. Pull rods 242 and 243 carry rollers 258 and 259 on their upper ends which engage arms 252 and 253 and draw them down when the pull rods are moved down.

Above and behind arms 252 and 253 are mounted rotatable posts 260 and 261 carrying bag holding arms 262 and 263 which are moved into the mouth of the open top bag to hold it while it is being filled. The lower ends of the posts are attached to links 264 and 265. A connecting link 266 carries pins 267 and 268 which slide in slots 269 and 270 in links 264 and 265. Link 266 is attached by a clevis 271 to a rod 272, which is attached by means of a bracket 273 to the piston rod 274a of an air cylinder 274. This linkage operates to move the bag holding arms 262 and 263 in and out of bag holding position in essentially the same manner as the horn operating linkage in the semi-automatic machine, except that the arms are moved into bag holding position on the advance stroke of the air cylinder.

The pneumatic system of the machine may be seen in FIG. 7. Cylinder 249 is connected by air lines 280 and 281 to solenoid valves 282 and 283. Cylinder 274 is connected by air lines 284 and 285 to a three-way solenoid operated valve 286. An air nozzle 287 is mounted on the upper part of the machine and directed obliquely downward toward the bag area. This nozzle and passage 228 and block 226 are connected by air line 288 to a solenoid valve 289. All the valves are connected through suitable supply lines to a source of compressed air (not shown). It is understood that the machine may also be provided with a manual shut-off valve at any convenient location.

The electrical system of the machine includes a photocell 290 and light source 291, mounted on opposite sides of the lift conveyor adjacent the lowest compartment of the rise portion, a plunger operated latching snap switch 292 mounted under plate 225, a spring return snap switch 293 mounted with its operating arm 293a in a position to be engaged by a striker plate 294 carried by rod 272, and a pair of spring return snap switches 295 and 296 mounted so as to be engaged alternately by a plate 297 carried by bar 246. A tilting lever 298 is mounted so as to be engaged by bar 240, when the pull rods 242 and 243 are moved down, and to engage the plunger 292a of switch 292 and reset the switch.

Figure 14:
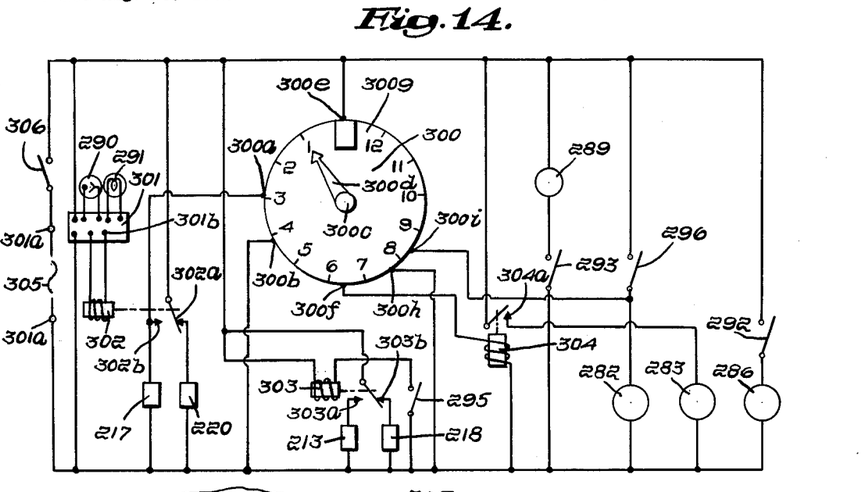
FIG. 14 is a schematic drawing of the electrical system for the machine of FIG. 7.

As shown in FIG. 14, the electrical system also includes an electric counter 300, a photoelectric relay 301, and relays 302, 303 and 304, which may be mounted in any convenient location. Counter 300 is of a commercially available type having an armature which is rotated a certain fraction of a revolution each time current is applied to a pair of input junctions 300a, and 300b. The armature is set by means of a knob 300c, carrying a pointer 300d, to a selected position with respect to a dial 300g. When the armature reaches the zero position the counter passes current through a pair of output junctions 300e and 300f. The counter is here shown as having twelve positions. By suitably setting the pointer, the counter may be made to pass current through the output junctions after any selected number of current impulses, from one to twelve, have been received through input junctions 300a and 300b. The counter also has a pair of re-setting contacts 300i and 300h. When current is applied to these contacts, the armature is automatically restored to the position originally selected by manually setting pointer 300d.

Photoelectric relay is of a common type which amplified current resulting from a change of condition in photocell 290, and passes the current through a pair of output junctions 301a, 301b to any device which it is desired to control. Relay 301 also has terminals for energizing light source 291. The relay is arranged for dark operation, that is, the output junctions are energized when the light beam from source 291 to photocell 290 is interrupted.

The electrical system is energized from a source of current 305, and the machine is preferably provided with a main shut-off switch 306. Relay 302 is connected in the output circuit of photoelectric relay 301, and controls a normally closed contact 302a and a normally open contact 302b. Contact 302b is connected in series with the clutch 217 of the lift conveyor drive, and contact 302a in series with the brake 220. Relay 303 is connected in series with switch 295 and controls a normally closed contact 303a and a normally open contact 303b. Contacts 303a and 303b are connected, respectively, to the clutch 213 and brake 218 of the horizontal conveyor drive. Relay 304 is connected in series with the output junctions of counter 300, and controls a normally open contact 304a which is in series with solenoid valve 283. Switches 293, 296, and 292 are connected in series with solenoid valves 289, 282, and 286, respectively.

The operation of the automatic machine is as follows: Articles to be loaded into the bags 50, for example bakery buns 310, are placed in spaced positions on conveyor belt 205. It is understood that the articles may be dropped on by hand or fed to the conveyor belt from suitable automatic means, such as a hopper feed. To start filling the first bag of a run, an article may also be placed in each of the upper compartments 210 on the rising portion of the lift conveyor. At the beginning of a loading cycle the piston rods of cylinders 249 and 274 are both in retracted position. Switch 293, which controls the energizing circuit of solenoid valve 289, is closed by engagement with striker plate 294. Consequently, compressed air is being delivered to nozzles 229 and 287 to open and inflate the top bag in the stack. Switch 295, which controls the energizing circuit of relay 303, is closed by engagement with striker plate 297. Contact 303b is therefore closed and clutch 213 is energized, causing conveyor belt 205 to be driven.

When a bun 310 drops into the lowest compartment 210 of the lift conveyor, the light beam to photocell 290 is interrupted, and relay 302 becomes energized, opening contact 302a to disengage brake 220, and closing contact 302b to engage clutch 217 and advance the lift conveyor drive. The conveyor runs until the photocell is illuminated again. When the bun has passed the photocell, the masking plate 209a in the compartment immediately following the newly filled one continues to interrupt the light beam. When the rear edge of this plate clears the photocell, the photocell is again illuminated and relay 302 drops out, stopping the conveyor. The plates 209a are of such a length as to permit the lift conveyor to be advanced by the space of one compartment in this manner, each time a bun drops off belt 205 into the bottom rising compartment 210.

When the lift conveyor is advanced one step, a bun 310 drops off the discharge end on to plate 225 and falls into the bag. When the first bun in a series strikes plates 225, switch 292 is closed, energizing solenoid valve 286. The piston rod 274a is advanced, turning arms 262, 263 into bag holding position. Shortly after the arms engage the mouth of the inflated bag, switch 293 is opened by plate 294, de-energizing valve 289 and shutting off the air to the air nozzles.

Each time relay 302 is energized in response to deposit of a new bun on the lift conveyor, as just described, current flows to the input junctions 300a and 300b of counter 300, advancing the counter armature one step. When the selected number of current impulses for which the counter has been set is reached, relay 304 becomes energized through output junctions 300e, 300f of the counter. At that point a corresponding number of buns will have been dropped into the open bag. The closing of contact 304a energizes solenoid 283, causing piston rod 249a to be advanced. The downward movement of pull rods 242 and 243 carries arms 252 and 253 down, to bring rollers 254 and 255 into engagement with the stack of unopened bags, and retract pins 231, as previously explained. The filled bag drops off.

At the beginning of the advance stroke of rod 249a switch 295 opens, de-energizing relay 303. Contact 303b opens and contact 303a closes, disengaging clutch 213 and energizing brake 218 so that the horizontal conveyor belt 205 stops. At the end of the down stroke of rods 242 and 243, plate 297 closes switch 296, energizing solenoid 282 to return rod 249a to retracted position. The closing of switch 296 also re-sets the counter. Bar 240 rocks lever 298, restoring switch 292 to open position and de-energizing valve 286, so that rod 274a starts its retract stroke. When the pistons of both cylinders are again retracted, switch 295 is closed, setting the horizontal conveyor in motion, and switch 293 is closed, opening valve 289 to the air jets. A new loading cycle then begins. The machine will thus re-cycle automatically and continue to open and fill bags with a selected number of articles.

In both its forms, the machine here disclosed effects a considerable saving in packaging costs. The labor of opening and separating the plastic bags, a difficult task to perform by hand because of the extreme thinness and electrostatic properties of the plastic film, is entirely eliminated. The combined action of the shallow horizontal air nozzle and oblique nozzle is extremely effective in opening the bags fully, so that articles will be properly placed.

The automatic type of machine requires no attention from the operator except to replenish the stack of bags from time to time, and drop articles on to the horizontal conveyor belt. The articles need not be placed in any accurate arrangement or spacing, as the lift conveyor is moved only in response to entrance of an article. For example, if the supply of articles runs out when a bag is only partly filled, the horizontal conveyor will merely continue to run empty, and the counter will begin to operate when a new supply of articles starts to enter the lift conveyor, at the correct position to finish filling the bag with the selected number of articles. The use of the semi-automatic machine reduces the labor required to the simple tasks of dropping articles into the horns and pressing the control button. This work can be easily performed by unskilled operators. The packages are neat and uniform and come off the machine ready for any subsequent closing operation, such as heat-sealing, or stapling the upper end of the bag.

What is claimed is:

1. A machine for opening and filling bags of the type having a mouth and a flap extending beyond said mouth, comprising: bag supporting means adapted to receive a stack of bags of said type; a flap securing device movable into and out of engagement with the flaps of the bags in the stack; a device for directing compressed air into the mouth of, and thus open, the top bag of the stack; a bag holding device movable into and out of engagement with the opened top bag and adapted when engaged therewith, to hold said bag in open configuration leaving portions of the remaining bags in the stack exposed; a stack gripping device movable into and out of engagement with said exposed portions; and a control system adapted to operate said devices in such sequence that the top bag is opened by said compressed air directing device, then engaged by said bag holding device, said flap securing device is disengaged and said stack gripping device is engaged with said exposed portions.

2. A machine as described in claim 1, said bag supporting means comprising an inclined plate, and spring pressed means for urging said plate upward.

3. A machine as described in claim 1, said bag supporting means comprising an inclined plate and the machine including means for varying the inclination of said plate.

4. A machine as described in claim 1, said flap securing device comprising a pair of pins disposed to extend through the flaps of the bags in said stack, and a fixed member disposed to overlie said flaps and engage said pins, said pins being retractable out of engagement with said flaps by operation of said control system.

5. A machine as described in claim 1, said flap securing device comprising a pair of stationary pins disposed to extend through the flaps of the bags in said stack and a movable member disposed to overlie said flaps and engage said pins, and said control system including means for moving said member out of engagement with said pins.

6. A machine as described in claim 1, said device for directing compressed air comprising a first air nozzle disposed to direct air substantially parallel to said stack and a second air nozzle disposed to direct air obliquely downward toward the stack.

7. A machine as described in claim 1, said stack gripping device comprising a pair of arms disposed on opposite sides of said bag supporting means rotatable in parallel planes into engagement with said stack.

8. A machine as described in claim 1, said stack gripping device comprising a pair of arms disposed on opposite sides of said bag supporting means and rotatable in opposite directions into engagement with said stack.

9. A machine as described in claim 1, said flap securing device comprising a pair of pins disposed to extend through the flaps of the bags in said stack and retracting means for moving said pins out of engagement with said flaps, said stack gripping device comprising a pair of arms rotatable into engagement with said stack, and said retracting means carrying means for so rotating said arms.

10. A machine as described in claim 1, said bag holding device comprising a first pair of rotatable arms and means for rotating said arms into engagement with the top bag of said stack, said stack gripping means comprising a second pair of arms rotatable into engagement with said stack, and said first pair of arms having connected thereto members engageable with said second pair and adapted to so rotate the same.

11. A machine for opening and filling bags of the type having a mouth and a flap extending beyond said mouth, comprising: bag supporting means adapted to receive a stack of bags of said type; a flap securing device movable into and out of engagement with the flaps of the bags in the stack; a device for directing compressed air into the mouth of, and thus open, the top bag of the stack; a bag holding device movable into and out of engagement with the opened top bag and adapted, when engaged therewith, to hold said bag in open configuration leaving portions of the remaining bags in the stack exposed; a stack gripping device movable into and out of engagement with said exposed portions; a control system adapted to maintain said devices in a dwell position, with said bag holding device engaged with the top bag, said flap securing device disengaged from said flaps and said stack gripping device engaged with said stack, and to operate said devices through a cycle in which said bag holding and stack gripping devices are disengaged, said flap securing device is engaged, said compressed air device is operated to open a bag, and said devices are returned to said dwell position; and means for initiating operation of said control system through said cycle.

12. A machine as described in claim 11, the means for initiating operation of said control system through said cycle comprising manually operable control means.

13. A machine as described in claim 11, having a conveyor adapted to receive articles to be loaded into the bags in said stack, and means for driving said conveyor to drop articles one by one into the opened bag, and the means for initiating operation of said control system through said cycle including a counter adapted to count articles passing by it on said conveyor and actuate said last mentioned means each time a predetermined number of articles has passed.

14. A machine as described in claim 11 including means for guiding an article into the opened top bag.

References Cited by the Examiner

UNITED STATES PATENTS

| | | | |
|---|---|---|---|
| 2,008,896 | 7/35 | Brown | 53—189 |
| 2,842,921 | 7/58 | Rasmusson | 53—189 |
| 3,044,233 | 7/62 | Altman | 53—385 |
| 3,059,390 | 10/62 | Handzel | 53—189 |

TRAVIS McGEHEE, *Primary Examiner.*